US012613445B2

(12) United States Patent
Ishimura

(10) Patent No.: US 12,613,445 B2
(45) Date of Patent: Apr. 28, 2026

(54) OPTICAL ANGLE MODULATOR AND OPTICAL TRANSMISSION APPARATUS

(71) Applicant: KDDI CORPORATION, Tokyo (JP)

(72) Inventor: Shota Ishimura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 383 days.

(21) Appl. No.: 18/517,045

(22) Filed: Nov. 22, 2023

(65) Prior Publication Data

US 2024/0085758 A1     Mar. 14, 2024

Related U.S. Application Data

(63) Continuation of application No. PCT/JP2022/010066, filed on Mar. 8, 2022.

(30) Foreign Application Priority Data

Jun. 1, 2021     (JP) ................................. 2021-092498

(51) Int. Cl.
    *G02F 1/295*        (2006.01)
    *G02F 1/35*         (2006.01)
(52) U.S. Cl.
    CPC ............ *G02F 1/295* (2013.01); *G02F 1/3507* (2021.01); *G02F 1/3536* (2013.01)
(58) Field of Classification Search
    CPC ...... G02F 1/295; G02F 1/3507; G02F 1/3536; H04B 10/548
    See application file for complete search history.

(56) References Cited

U.S. PATENT DOCUMENTS

| | | | | |
|---|---|---|---|---|
| 4,784,450 A | * | 11/1988 | Jain ........................ | G02F 1/3536 |
| | | | | 385/11 |
| 6,879,433 B1 | * | 4/2005 | Yamashita ............ | G02F 1/3536 |
| | | | | 359/332 |
| 2008/0056730 A1 | | 3/2008 | Nojima et al. | |

FOREIGN PATENT DOCUMENTS

| | | | |
|---|---|---|---|
| JP | 2002-023210 A | 1/2002 | |
| JP | 2006-049977 A | 2/2006 | |
| JP | 2021-129208 A | 9/2021 | |

OTHER PUBLICATIONS

Di Che, et al., "High-fidelity angle-modulated analog optical link", Optics Express, Jul. 25, 2016, pp. 16320-16328, vol. 24, No. 15 (9 pages).

(Continued)

*Primary Examiner* — John Bedtelyon
(74) *Attorney, Agent, or Firm* — Foley & Lardner LLP

(57) ABSTRACT

An optical angle modulator includes: a first unit configured to generate first angle-modulated light and second angle-modulated light by performing angle modulation on continuous light using an electrical signal; and a second unit configured to generate third angle-modulated light by causing partially degenerate four-wave mixing of the first and second angle-modulated lights. A frequency band of the first angle-modulated light and a frequency band of the second angle-modulated light are different, and an angle of the second angle-modulated light decreases due to the electrical signal while an angle of the first angle-modulated light is increasing due to the electrical signal, and the angle of the second angle-modulated light increases due to the electrical signal while the angle of the first angle-modulated light is decreasing due to the electrical signal.

15 Claims, 6 Drawing Sheets

(56)                    References Cited

OTHER PUBLICATIONS

Shota Ishimura et al., "SSBI-Free 1024QAM Single-Sideband Direct-Detection Transmission using Phase Modulation for High-Quality Analog Mobile Fronthaul", 45th European Conference on Optical Communication (ECOC 2019), Sep. 2019, pp. 1-4 (4 pages).
Shota Ishimura et al., "SSBI-Free Direct-Detection System Employing Phase Modulation for Analog Optical Links", Journal of Lightwave Technology, May 6, 2020, pp. 2719-2725, vol. 38, No. 9 (7 pages).
Shota Ishimura et al., "SSBI-Free Photonic Armstrong Method for Ultra-Wideband PM Signal Generation", 2020 European Conference on Optical Communications (ECOC), Dec. 2012 (4 pages).

\* cited by examiner

ELECTRICAL SIGNAL

100

16 — ANGLE MODULATOR

17 — LIGHT SOURCE $f_3$

18 — OPTICAL MODULATING UNIT $f_1$
$f_2$
$f_3$

19 — BSF $f_1$
$f_2$

F I G. 6

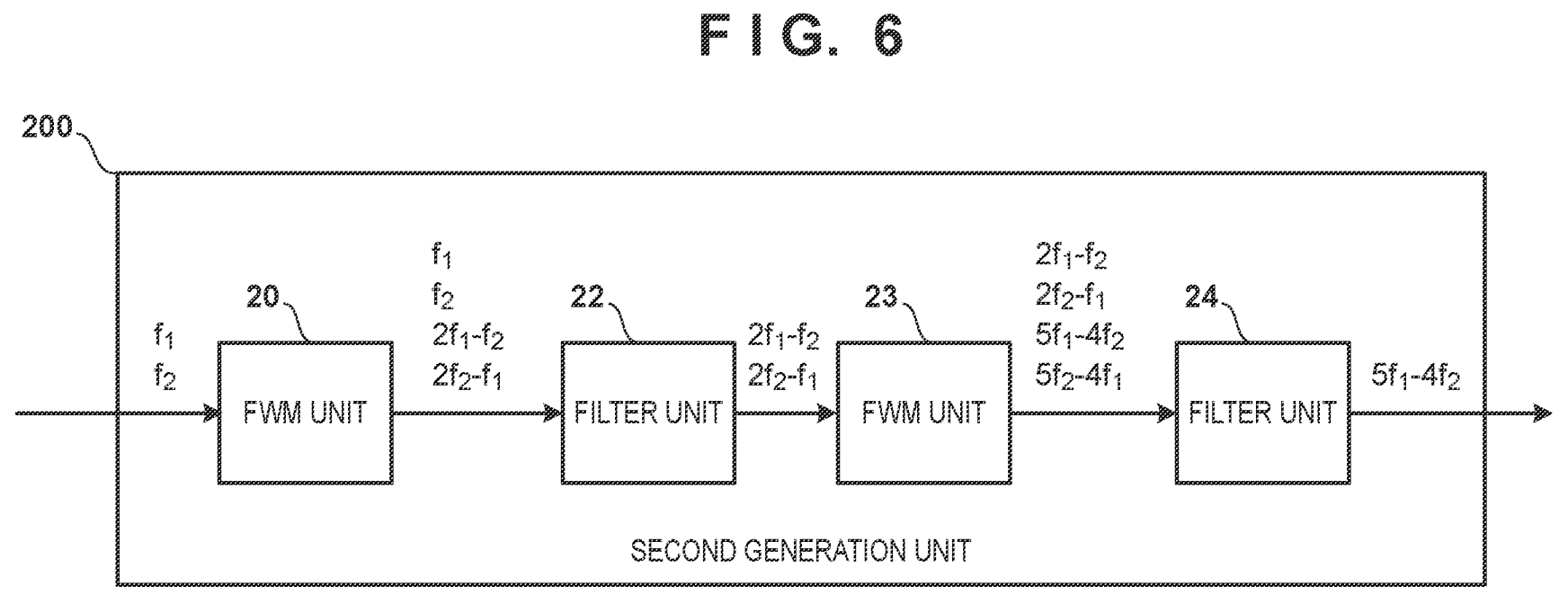

200

$f_1$
$f_2$

FWM UNIT

20

$f_1$
$f_2$
$2f_1-f_2$
$2f_2-f_1$

FILTER UNIT

22

$2f_1-f_2$
$2f_2-f_1$

FWM UNIT

23

$2f_1-f_2$
$2f_2-f_1$
$5f_1-4f_2$
$5f_2-4f_1$

FILTER UNIT

24

$5f_1-4f_2$

SECOND GENERATION UNIT

OPTICAL ANGLE MODULATOR AND OPTICAL TRANSMISSION APPARATUS

CROSS-REFERENCE TO RELATED APPLICATION(S)

This application is a continuation of International Patent Application No. PCT/JP2022/010066 filed on Mar. 8, 2022, which claims priority to and the benefit of Japanese Patent Application No. 2021-092498 filed on Jun. 1, 2021, the entire disclosures of which are incorporated herein by reference.

BACKGROUND OF THE INVENTION

Field of the Invention

The present invention relates to an optical angle modulation technique.

Description of the Related Art

Non-patent Literatures (NPL) 1 and 2 each disclose an optical modulator (optical angle modulator) that performs angle modulation. Note that angle modulation is a collective term for frequency modulation and phase modulation. The broader the bandwidth of angle-modulated light generated by such an optical angle modulator is, the more favorable the signal-to-noise ratio thereof becomes.

NPL1: S. Ishimura, et. al., "SSBI-Free Direct-Detection System Employing Phase Modulation for Analog Optical Links", in Journal of Lightwave Technology, vol. 38, no. 9, pp. 2719-2725, 2020

NPL2: D. Che, et. al., "High-fidelity angle-modulated analog optical link", Opt. Express, vol. 24, pp. 16320-16328, 2016

SUMMARY OF THE INVENTION

Optical angle modulators change the angle of continuous light, that is to say the phase or frequency of continuous light in accordance with the amplitude of an electrical signal (for conveying information) that is applied thereto. In order to generate broad-band angle-modulated light, the amplitude of the electrical signal, that is to say the voltage level of the electrical signal that is applied to the optical angle modulators needs to be high. However, it is not easy to generate an electrical signal that has a high voltage level while maintaining the linearity, and the electrical power consumption increases.

According to an aspect of the present disclosure, an optical angle modulator includes: a first generating unit configured to generate first angle-modulated light and second angle-modulated light by performing angle modulation on continuous light using an electrical signal; and a second generating unit configured to generate third angle-modulated light by causing partially degenerate four-wave mixing of the first angle-modulated light and the second angle-modulated light, wherein a frequency band of the first angle-modulated light and a frequency band of the second angle-modulated light are different from each other, and an angle of the second angle-modulated light decreases due to the electrical signal while an angle of the first angle-modulated light is increasing due to the electrical signal, and the angle of the second angle-modulated light increases due to the electrical signal while the angle of the first angle-modulated light is decreasing due to the electrical signal.

Further features of the present invention will become apparent from the following description of exemplary embodiments with reference to the attached drawings.

BRIEF DESCRIPTION OF THE DRAWINGS

FIG. 2 is a diagram showing a signal that is generated inside the optical angle modulator according to an embodiment.

FIG. 3 is a diagram of a configuration of a first generation unit according to an embodiment.

FIG. 4 is a diagram of a configuration of the first generation unit according to an embodiment.

FIG. 6 is a diagram of a configuration of a second generation unit according to an embodiment.

DESCRIPTION OF THE EMBODIMENTS

Figure 1:
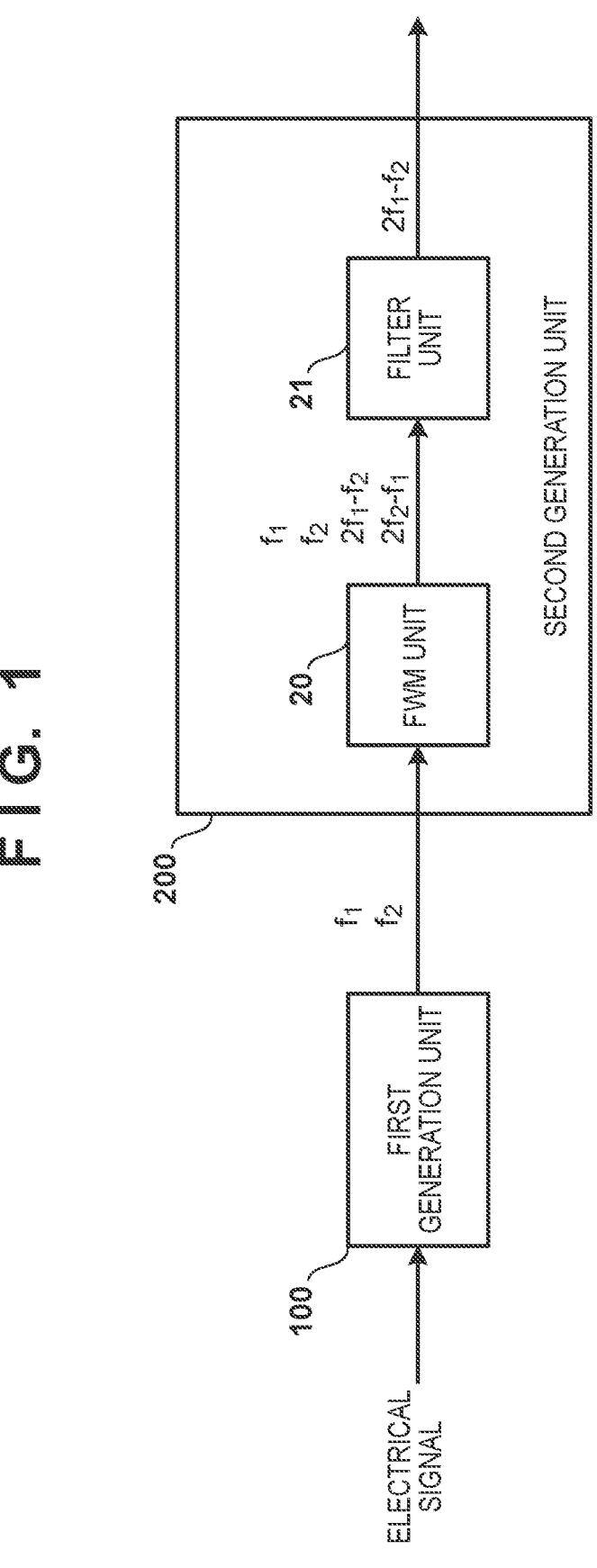
FIG. 1 is a diagram of a configuration of an optical angle modulator according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 2:
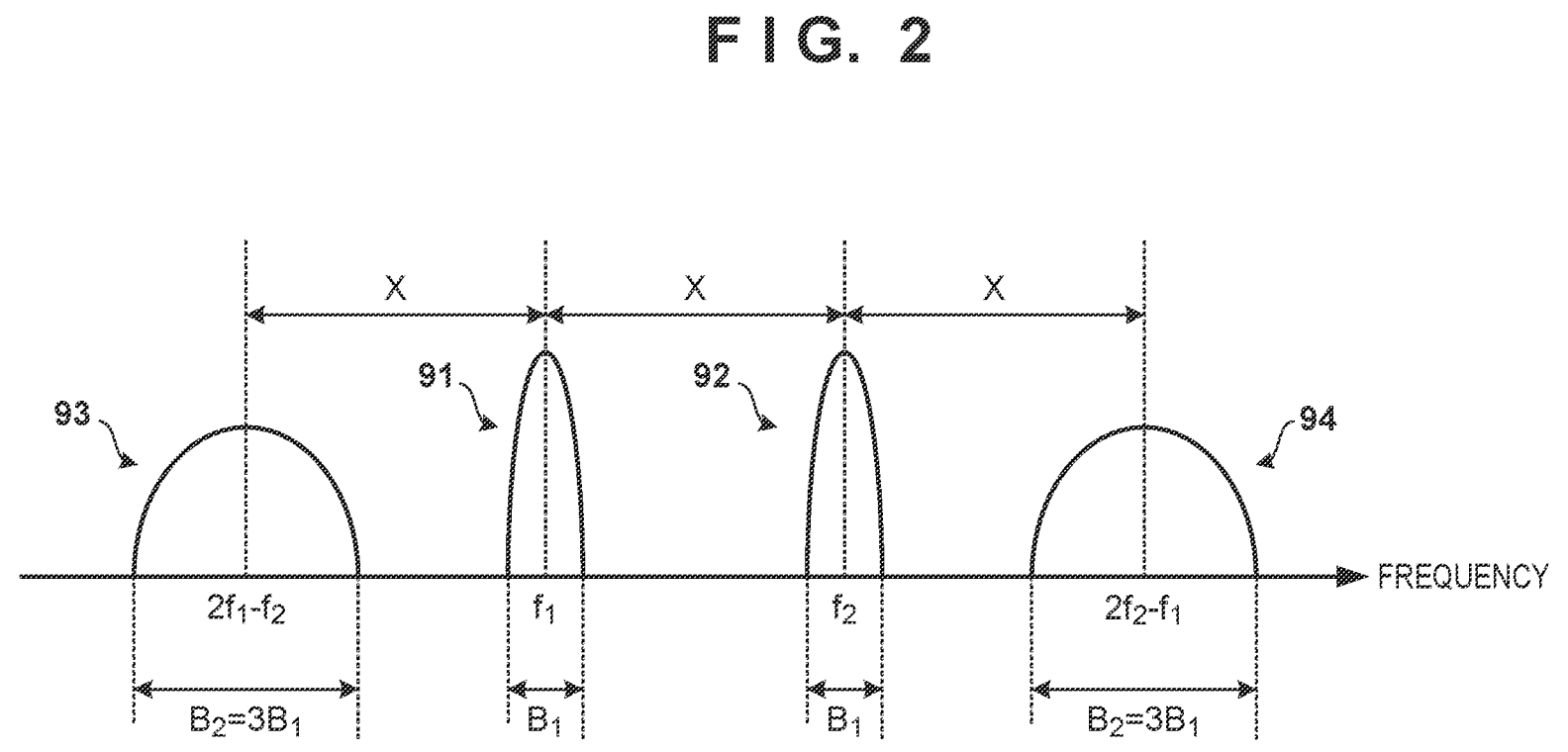

FIG. 1 is a diagram of a configuration of an optical angle modulator according to the present embodiment. A first generation unit 100 generates angle-modulated light 91 whose central frequency is $f_1$ and angle-modulated light 92 whose central frequency is $f_2$, which are shown in FIG. 2, based on an electrical signal that conveys information, and outputs the generated angle-modulated light 91 and angle-modulated light 92 to a second generation unit 200. Note that, in the present embodiment, as shown in FIG. 2, $f_2 > f_1$, and the frequency difference between $f_2$ and $f_1$ is denoted by X.

The angle-modulated light 91 and the angle-modulated light 92 are generated based on the same electrical signal, but the first generation unit 100 generates the angle-modulated light 91 and the angle-modulated light 92 such that an electric field component of the angle-modulated light 91 and an electric field component of the angle-modulated light 92 have a complex conjugate relation, for example. Specifically, for example, if the angle-modulated light 91 is generated by advancing the phase of continuous light when the amplitude of the electrical signal is positive and delaying the phase of the continuous light when the amplitude of the electrical signal is negative, then the angle-modulated light 92 is generated by advancing the phase of continuous light when the amplitude of the electrical signal is negative and delaying the phase of continuous light when the amplitude of the electrical signal is positive. Similarly, for example, if the angle-modulated light 91 is generated by increasing the frequency of continuous light when the amplitude of the electrical signal is positive and decreasing the frequency of continuous light when the amplitude of the electrical signal is negative, then the angle-modulated light 92 is generated by increasing the frequency of continuous light the amplitude of the electrical signal is negative and decreasing the frequency of continuous light when the amplitude of the electrical signal is positive.

Therefore, when the electrical signal is denoted by m (t), the electric field component $E_1$ of the angle-modulated light 91 and the electric field component $E_2$ of the angle-modulated light 92 are respectively expressed as follows.

$$E_1 = e^{j\{\omega 1 t + km(t)\}} \tag{1}$$

$$E_2 = e^{j\{\omega 2 t - km(t)\}} \tag{2}$$

Here, $\omega_1 = 2\pi f_1$, $\omega_2 = 2\pi f_2$, and k indicates a modulation index. km (t) corresponds to the amount of change in the phase or frequency (angle change amount) of continuous light caused by angle modulation, and the larger the maximum value of km (t) is, the broader the bandwidth of angle-modulated light becomes. In other words, the bandwidths of the angle-modulated light 91 and the angle-modulated light 92 correspond to km (t), and the larger the value of km (t) is, the broader the bandwidths of the angle-modulated light 91 and the angle-modulated light 92 become. Note that, as shown in FIG. 2, in this example, the bandwidth of each of the angle-modulated light 91 and the angle-modulated light 92 corresponding to km (t) are denoted by $B_1$.

A four-wave mixing (FWM) unit 20 of the second generation unit 200 causes partially degenerate four-wave mixing of the angle-modulated light 91 and the angle-modulated light 92. Partially degenerate four-wave mixing is an aspect of four-wave mixing, and refers to a phenomenon in which new light having a frequency $2f_x - f_y$ (or $2f_y - f_x$) is generated from two types of light respectively having a frequency $f_x$ and a frequency $f_y$. Letting the electric field component of the light having the frequency $f_x$ be $E_x$ and the electric field component of the light having the frequency $f_y$ be $E_y$, the electric field component of the light having the frequency $2f_x - f_y$ generated by partially degenerate four-wave mixing is $E_x E_x E^*_y$. Note that $E^*_y$ indicates the complex conjugate of $E_y$. Similarly, the electric field component of the light having the frequency $2f_y - f_x$ generated by partially degenerate four-wave mixing is $E_y E_y E^*_x$.

Therefore, based on partially degenerate four-wave mixing caused by the FWM unit 20, angle-modulated light 93 whose central frequency is $2f_1 - f_2$ and angle-modulated light 94 whose central frequency is $2f_2 - f_1$, which are shown in FIG. 2, are generated. Here, an electric field component $E_3$ of the angle-modulated light 93 and an electric field component $E_4$ of the angle-modulated light 94 are respectively expressed as follows.

$$E_3 = E_1 E_1 E_2^* = e^{j\{2(\omega 1 - \omega 2)t + 3km(t)\}} \tag{3}$$

$$E_4 = E_2 E_2 E_1^* = e^{j\{2(\omega 2 - \omega 1)t - 3km(t)\}} \tag{4}$$

Expressions (3) and (4) indicate that the angle change amount of each of the angle-modulated light 93 and the angle-modulated light 94 is 3 km (t), in other words three times the angle change amount of each of the angle-modulated light 91 and the angle-modulated light 92. Therefore, as shown in FIG. 2, the bandwidth $B_2$ of each of the angle-modulated light 93 and the angle-modulated light 94 is three times the bandwidth of each of the angle-modulated light 91 and the angle-modulated light 92, in other words, $3B_1$. FIG. 2 shows frequency components of signal light output by the FWM unit 20.

A filter unit 21 passes through the angle-modulated light 93 of the signal light output by the FWM unit 20, which is shown in FIG. 2, and attenuates and blocks the other angle-modulated light. Note that the filter unit 21 may allow the angle-modulated light 94 to pass, and attenuate and block the other angle-modulated light. Accordingly, the optical angle modulator can generate and output angle-modulated light having a frequency bandwidth that is three times that of each of the angle-modulated light 91 and the angle-modulated light 92. Therefore, it is possible to generate angle-modulated light having a frequency bandwidth that is three times that of a conventional technique based on electrical signal of the same voltage level.

The FWM unit 20 can be constituted by an optical fiber such as a dispersion shift fiber, for example. Strong four-wave mixing occurs when the frequency (wavelength) of light that is input to the optical fiber is close to a frequency (wavelength) at which the wavelength dispersion value of the optical fiber is zero. In the case of partially degenerate four-wave mixing, for example, when the wavelength dispersion value of the optical fiber at the frequency of the angle-modulated light 91 is close to zero, the angle-modulated light 93 having the frequency $2f_1 - f_2$ is generated strongly. Therefore, when the filter unit 21 allows the angle-modulated light 93 to pass, the angle-modulated light 93 can be efficiently generated by determining the frequency $f_1$ and the frequency $f_2$ such that a frequency (wavelength) at which dispersion of the optical fiber is 0 is positioned within the frequency band of the angle-modulated light 91. As an example, it is possible to efficiently generate the angle-modulated light 93 by setting the frequency $f_1$ to a frequency at which dispersion of the optical fiber is 0.

Similarly, when the wavelength dispersion value of the optical fiber at the frequency of the angle-modulated light 92 is close to zero, the angle-modulated light 94 having the frequency $2f_2 - f_1$ is generated strongly. Therefore, when the filter unit 21 allows the angle-modulated light 94 to pass, it is possible to efficiently generate the angle-modulated light 94 by determining the frequency $f_1$ and the frequency $f_2$ such that a frequency (wavelength) at which dispersion of the optical fiber is 0 is positioned within in the frequency band of the angle-modulated light 92. As an example, it is possible to efficiently generate the angle-modulated light 94 by setting the frequency $f_2$ to a frequency at which dispersion of the optical fiber is 0.

Note that the present invention is not limited to a configuration in which a frequency at which dispersion of an optical fiber is 0 is set within the frequency band of the angle-modulated light 91 or the angle-modulated light 92. A configuration can be adopted in which, for example, a frequency at which dispersion of an optical fiber is 0 is set within the frequency band between the frequency band of the angle-modulated light 91 and the frequency band of the angle-modulated light 92, and thereby the angle-modulated light 93 and the angle-modulated light 94 are generated. Furthermore, partially degenerate four-wave mixing occurs whether a frequency at which dispersion of an optical fiber is 0 is lower than the frequency band of the angle-modulated light 91 or higher than the frequency band of the angle-modulated light 92, and thus the frequency at which dispersion of the optical fiber is 0 may be lower than the frequency band of the angle-modulated light 91 or higher than the frequency band of the angle-modulated light 92, as long as the angle-modulated light 93 or the angle-modulated light 94 is generated.

In addition, the FWM unit 24 can be constituted by a semiconductor optical amplifier. Four-wave mixing can be caused by the non-linearity of the semiconductor optical amplifier Note that, in the above description, as indicated by Expressions (1) and (2), the modulation indexes of the angle-modulated light 91 and the angle-modulated light 92 are the same value, namely "k", but the modulation indexes of the angle-modulated light 91 and the angle-modulated light 92 do not need to be the same. If the modulation index of the angle-modulated light 91 is k, and the modulation index of the angle-modulated light 92 is 0.5k, for example, as clearly indicated by Expressions (1) to (4), the bandwidth of the angle-modulated light 93 is $2.5B_1$, and the bandwidth of the angle-modulated light 94 is $2B_1$, which are smaller than $3B_1$ that is a bandwidth when both the modulation indexes are k, but, in any way, the bandwidth of each of the angle-modulated light 93 and the angle-modulated light 94 is broader than the bandwidth of each of the angle-modulated light 91 and the angle-modulated light 92. To summarize, as clearly indicated by Expressions (1) to (4), if the bandwidths of two types of angle-modulated light are the same (modulation indexes are the same), the bandwidth of angle-modulated light generated by causing partially degenerate four-wave mixing is three times the original angle-modulated light. On the other hand, if the bandwidths of the two types of angle-modulated light are different (if the modulation indexes are different), the bandwidth of one angle-modulated light of two types of angle-modulated light generated by causing partially degenerate four-wave mixing is smaller than three times the bandwidth of angle-modulated light having a broader frequency band, of the original two types of angle-modulated light, but is larger than twice the bandwidth of angle-modulated light beam having a broader frequency band, of the original two types of angle-modulated light.

Note that, if the modulation indexes of the angle-modulated light 91 and the angle-modulated light 92 are different, the electric field component $E_1$ of the angle-modulated light 91 and the electric field component $E_2$ of the angle-modulated light 92 do not have a complex conjugate relation. Specifically, if the electric field component $E_1$ of the angle-modulated light 91 and the electric field component $E_2$ of the angle-modulated light 92 have a complex conjugate relation, it is possible to maximize the bandwidth of angle-modulated light generated by causing partially degenerate four-wave mixing, but the electric field component $E_1$ and the electric field component $E_2$ having a complex conjugate relation is not a condition required for broadening the bandwidth of angle-modulated light generated by causing partially degenerate four-wave mixing to a bandwidth broader than the bandwidth of each of the angle-modulated light 91 and the angle-modulated light 92. That is to say, regarding the angle-modulated light 91 and the angle-modulated light 92 generated from the same electrical signal, it suffices for the angle-modulated light 91 and the angle-modulated light 92 to be generated such that the angle (phase or frequency) of the angle-modulated light 92 decreases while the angle of the angle-modulated light 91 is increasing, and the angle of the angle-modulated light 92 increases while the angle of the angle-modulated light 91 is decreasing, and such an aspect is within the scope of the present invention.

In addition, in the above description, the amplitudes of the angle-modulated light 91 and the angle-modulated light 92 are the same. If the amplitudes of the angle-modulated light 91 and the angle-modulated light 92 are different from each other, the amplitudes of the angle-modulated light 93 and the angle-modulated light 94 are also different accordingly, but no problem arises in angle modulation. Therefore, the amplitudes of the angle-modulated light 91 and the angle-modulated light 92 may be different.

Note that, in order to prevent the angle-modulated light 93 and the angle-modulated light 94 from interfering with the angle-modulated light 91 and the angle-modulated light 92 when the bandwidth of each of the angle-modulated light 93 and the angle-modulated light 94 are three times that of each of the angle-modulated light 91 and the angle-modulated light 92, X needs to be larger than $2B_1$ as clearly shown in FIG. 2. Note that, as described above, when the modulation indexes of two types of angle-modulated light are different, the bandwidth of each of the angle-modulated light 93 and the angle-modulated light 94 is not three times the bandwidth of each of the angle-modulated light 91 and the angle-modulated light 92. Therefore, more generally, letting the bandwidth of angle-modulated light having a broader frequency band, of the angle-modulated light 93 and the angle-modulated light 94 be $B_x$, and the bandwidth of angle-modulated light having a narrower frequency band be $B_y$, it suffices for X to be larger than $(3B_x+B_y)/2$.

Figure 3:
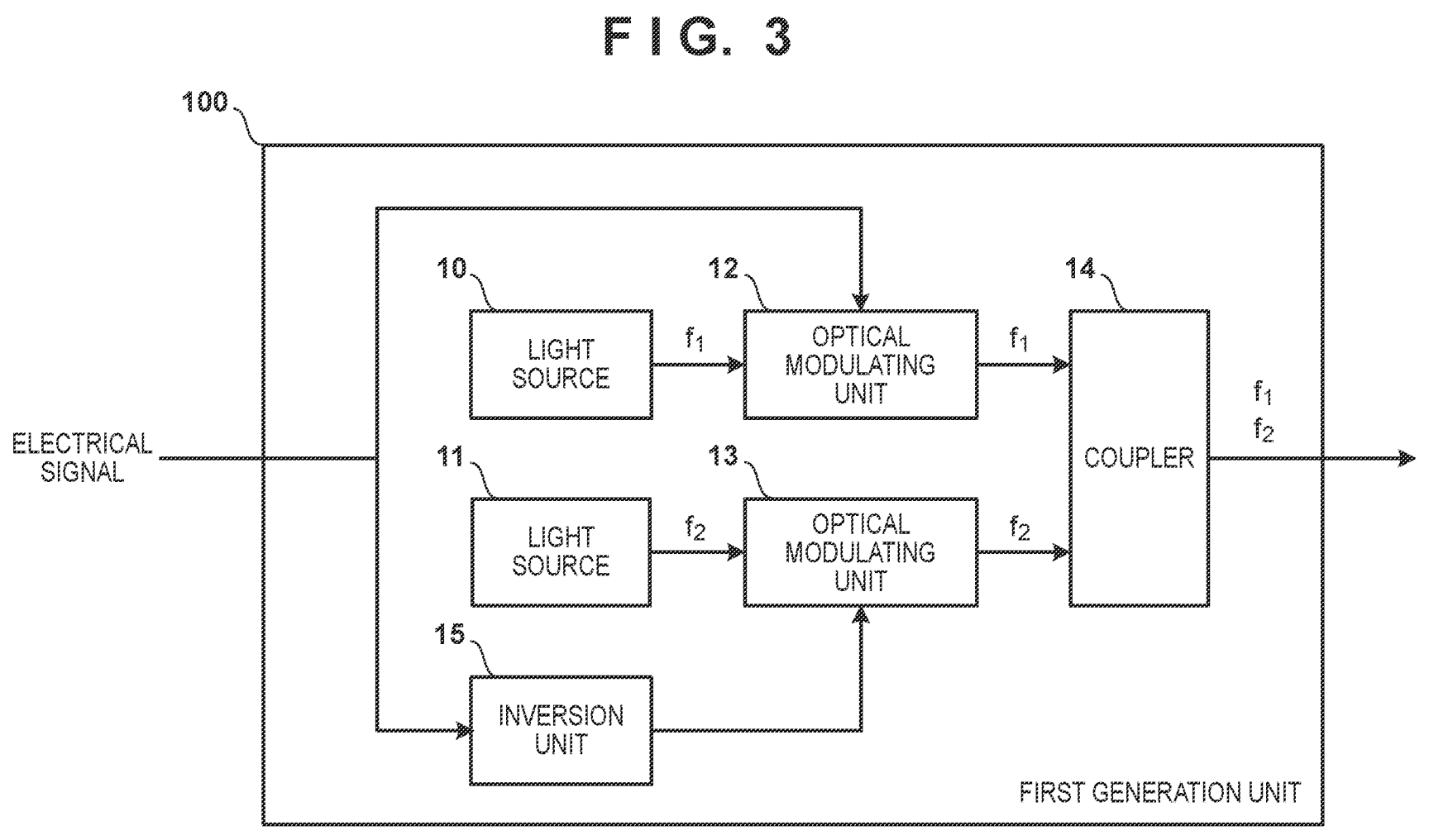

Next, a configuration example of the first generation unit 100 will be described. FIG. 3 shows a configuration example of the first generation unit 100. An electrical signal is input to an optical modulating unit 12, and is input to an inversion unit 15. The inversion unit 15 outputs an inverted electrical signal obtained by inverting the amplitude of the electrical signal, to an optical modulating unit 13. A light source 10 generates continuous light having the frequency $f_1$, and a light source 11 generates continuous light having the frequency $f_2$.

The optical modulating unit 12 performs optical angle modulation on the continuous light having the frequency $f_1$ generated by the light source 10, using the electrical signal, and outputs the angle-modulated light 91. On the other hand, the optical modulating unit 13 performs optical angle modulation on the continuous light having the frequency $f_2$ generated by the light source 11, using the inverted electrical signal, and outputs the angle-modulated light 92. Note that, with respect to the optical modulating unit 12 and the optical modulating unit 13, the directions in which the angle of continuous light is changed (increased or decreased) in accordance with whether the amplitude of the electrical signal is positive or negative are the same. In the example in FIG. 3, an electrical signal m(t) is input to the optical modulating unit 12, and an inverted electrical signal−m(t) is input to the optical modulating unit 13, and thus the direction in which the phases or frequencies of the electric field components of the angle-modulated light 92 and the electric field component of the angle-modulated light 93 increase/decrease are opposite to each other. Note that a configuration can also be adopted in which the inversion unit 15 is omitted, and instead, the directions in which the angles of continuous light are changed (increased or decreased) in accordance with whether the amplitude of electrical signal is positive or negative are different between the optical modulating unit 12 and the optical modulating unit 13. A configuration can also be adopted in which, for example, a functional block that includes the inversion unit 15 and the optical modulating unit 13 serves as one optical modulating unit, in other words, the inversion unit 15 serves as a constituent element of the optical modulating unit 13.

A coupler 14 multiplexes the angle-modulated light 91 from the optical modulating unit 12 and the angle-modulated light 92 from the optical modulating unit 13, and outputs signal light that includes the angle-modulated light 91 and the angle-modulated light 92.

Note that, in the configuration example in FIG. 3, the modulation indexes of the angle-modulated light 91 and the angle-modulated light 92 can be made the same by using the same modulator as the optical modulating unit 12 and the optical modulating unit 13, and thus, the bandwidth of each of the angle-modulated light 93 and the angle-modulated light 94 can be made three times the bandwidth of each of the angle-modulated light 91 and the angle-modulated light 92. However, as described above, the modulation indexes of optical angle modulation of the optical modulating unit 12 and the optical modulating unit 13 do not need to be the same.

Figure 4:
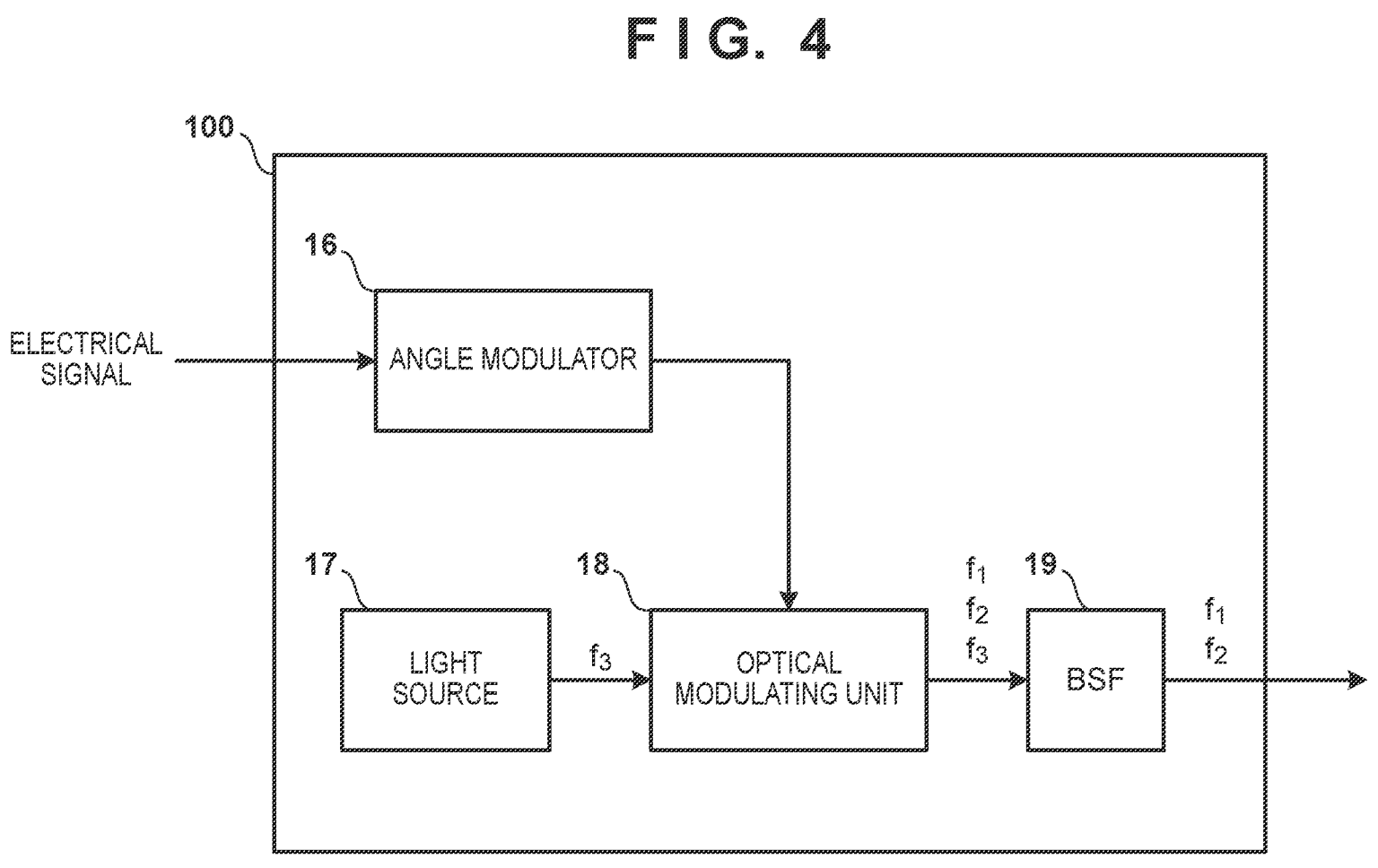

FIG. 4 shows another configuration example of the first generation unit 100. An angle modulator 16 includes an oscillator that generates a sine wave signal having a frequency $f_C=X/2$, and performs angle modulation on the sine wave signal using the electrical signal m(t) and outputs an angle modulation signal. A light source 17 emits continuous light having a frequency $f_3=(f_1+f_2)/2$. An optical modulating unit 18 performs light intensity (amplitude) modulation on the continuous light having the frequency $f_3$ using the angle modulation signal from the angle modulator 16, and outputs intensity-modulated light.

Figure 5:
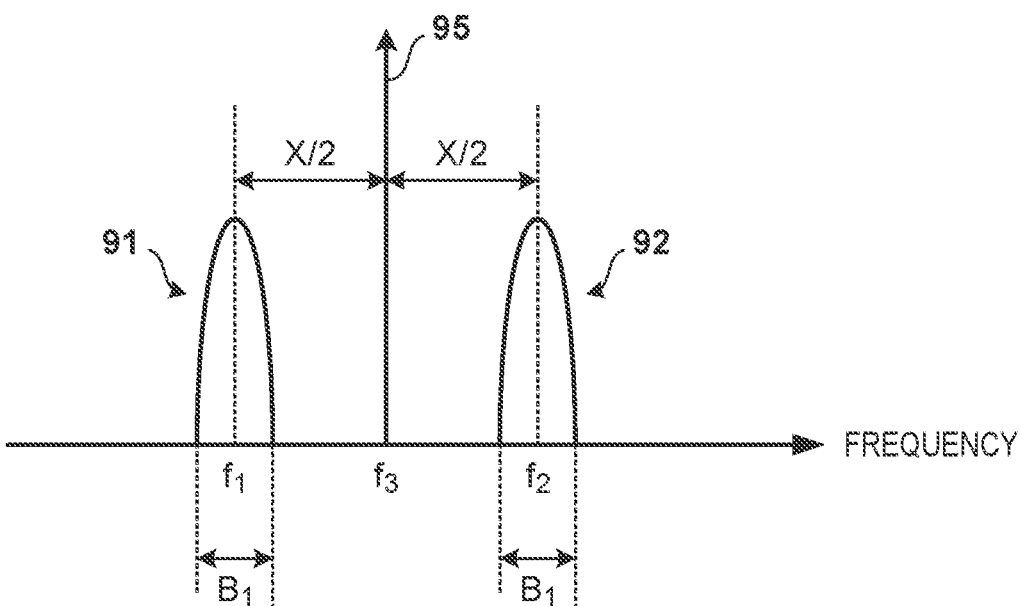
FIG. 5 is a diagram showing a signal that is generated inside the first generation unit according to an embodiment.

FIG. 5 shows intensity-modulated light that is output by the optical modulating unit 18. In FIG. 5, reference numeral 95 indicates an optical carrier component (carrier wave) of the frequency $f_3$. An upper sideband and a lower sideband corresponding to an angle modulation signal are generated based on light intensity modulation. The frequency difference between an optical carrier component 95 and the central frequencies of the upper sideband and the lower sideband is $X/2$, which is equal to the frequency of the sine wave signal. Therefore, the central frequency of the lower sideband is $f_1$, and the central frequency of the upper sideband is $f_2$. In addition, the upper sideband and the lower sideband have a complex conjugate relation. Therefore, the lower sideband corresponds to the angle-modulated light 91, and the upper sideband corresponds to the angle-modulated light 92.

Returning to FIG. 4, a band-stop filter (BSF) 19 attenuates and blocks the optical carrier component 95 of the intensity-modulated light output by the optical modulating unit 18. Therefore, signal light that is output by the BSF 19 is similar to signal light that is output by the coupler 14 in FIG. 3.

Note that, in the configuration in FIG. 4, the modulation indexes of the angle-modulated light 91 and the angle-modulated light 92 are the same, and thus the bandwidth of each of the angle-modulated light 93 and the angle-modulated light 94 is three times the bandwidth of each of the angle-modulated light 91 and the angle-modulated light 92. Therefore, X needs to be larger than $2B_1$. Note that the bandwidth $B_1$ is also the bandwidth of angle modulation signal that is output by the angle modulation unit 16. Therefore, the frequency $f_C$ of the sine wave signal generated by the angle modulator 16 needs to be $X/2>B_1$.

Note that, in FIG. 4, the optical carrier component 95 is suppressed by the BSF 19, but a configuration can be adopted in which the optical modulating unit 18 performs carrier wave suppressing intensity (amplitude) modulation and the BSF 19 is omitted. In addition, a configuration can also be adopted in which the remaining optical carrier component 95 is further suppressed by the BSF 19 while performing carrier wave suppressing intensity (amplitude) modulation.

Second Embodiment

Next, a second embodiment will be described with a focus on differences from the first embodiment. In the first embodiment, partially degenerate four-wave mixing is caused only once, and thereby the angle-modulated light 93 and the angle-modulated light 94 are generated, and the angle-modulated light 93 or the angle-modulated light 94 is regarded as output of the optical angle modulator. In the present embodiment, partially degenerate four-wave mixing is caused twice or more, and thereby angle-modulated light having a broader bandwidth than the first embodiment is generated. Note that, as described in the first embodiment, regarding the electric field component $E_1$ of the angle-modulated light 91 and the electric field component $E_2$ of the angle-modulated light 92, it suffices for the directions in which the angles are increased/decreased by an electrical signal to be opposite to each other, and there is no need to have a complex conjugate relation, but, in the following description, for ease of description, the electric field component $E_1$ of the angle-modulated light 91 and the electric field component $E_2$ of the angle-modulated light 92 have a complex conjugate relation.

FIG. 6 is a diagram of a configuration of the second generation unit 200 according to the present embodiment. Note that FIG. 6 shows a configuration in which partially degenerate four-wave mixing is caused twice. In addition, the configuration of the first generation unit 100 is similar to that in the first embodiment. The FWM unit 20 is similar to that in the first embodiment, and thus, generates signal light shown in FIG. 2. A filter unit 22 suppresses the angle-modulated light 91 and the angle-modulated light 92 included in the signal light shown in FIG. 2, and outputs signal light that includes the angle-modulated light 93 and the angle-modulated light 94, to an FWM unit 23.

The FWM unit 23 causes partially degenerate four-wave mixing of the angle-modulated light 93 and the angle-modulated light 94. As indicated by Expressions (3) and (4), the angle-modulated light 93 and the angle-modulated light 94 have a complex conjugate relation. Therefore, by causing partially degenerate four-wave mixing of the angle-modulated light 93 and the angle-modulated light 94, it is possible to generate signal light that includes, as a component thereof, angle-modulated light having a broader bandwidth than the angle-modulated light 93 and the angle-modulated light 94. Note that the central frequencies of two types of angle-modulated light generated by causing partially degenerate four-wave mixing of the angle-modulated light 93 and the angle-modulated light 94 are respectively $5f_1-4f_2$ and $5f_2-4f_1$. In addition, the bandwidth of angle-modulated light generated by causing partially degenerate four-wave mixing of the angle-modulated light 93 and the angle-modulated light 94 is nine times the bandwidth of each of the angle-modulated light 91 and the angle-modulated light 92. A filter unit 24 receives two types of angle-modulated light generated by causing partially degenerate four-wave mixing of the angle-modulated light 93 and the angle-modulated light 94, and allows only one of the received two types of angle-modulated light to pass, and blocks the other angle-modulated light.

Note that the second generation unit 200 in FIG. 6 causes partially degenerate four-wave mixing twice, but a configuration can also be adopted in which partially degenerate four-wave mixing is caused three times or more by the second generation unit 200. Generally speaking, the second generation unit 200 has a configuration in which a plurality of sets of an FWM unit and a filter unit to which output of the FWM unit is input are connected in series. Note that the number of sets connected in series equals to the number of times partially degenerate four-wave mixing is caused.

First, the angle-modulated light 91 and the angle-modulated light 92 are input as input angle-modulated light to the FWM unit in the first set in the sets connected in series. In addition, two types of input angle-modulated light are input to the FWM unit in a set among the sets connected in series other than the first set, from the filter unit of the immediately previous set. The FWM unit of each set generates two types of new angle-modulated light (new angle-modulated light) by causing partially degenerate four-wave mixing of two types of input angle-modulated light, and outputs signal light that includes the two types of input angle-modulated light and the two types of new angle-modulated light to the filter unit in the same set.

The filter unit in a set from among the sets connected in series other than the last set blocks two types of input angle-modulated light included in signal light that is input from the FWM unit in the same set, and outputs two types of new angle-modulated light to the FWM unit of a later-stage set. The two types of new angle-modulated light are handled as two types of input angle-modulated light, in the later-stage set.

In addition, the filter unit in the last set among the sets connected in series receives four types of angle-modulated light included in signal light that is input from the FWM unit in the same set, and allows only one new angle-modulated light among the received four types of angle-modulated light to pass, which is regarded as output of the optical angle modulator.

As described above, by causing partially degenerate four-wave mixing of two types of angle-modulated light that were generated based on the same electrical signal and are different in the direction in which the angle increases/decreases, angle-modulated light having a broader bandwidth than these two types of angle-modulated light is generated. Therefore, it is possible to generate angle-modulated light having a broad frequency band without increasing the voltage level of the electrical signal. Note that the optical angle modulator according to the above embodiments can be applied to an optical transmission apparatus of an optical communication system that uses optical angle modulation. Therefore, the optical transmission apparatus that includes the optical angle modulator according to the present embodiment is also included in the scope of the present invention.

With the above-described configuration, it is possible to generate angle-modulated light having a broad bandwidth. Therefore, it is possible to contribute to the goal 9 "build resilient infrastructure, promote sustainable industrialization and foster innovation" of sustainable development goals (SDGs) led by the United Nations.

The present invention is not limited to the above embodiments and various changes and modifications can be made within the spirit and scope of the present invention. Therefore, to apprise the public of the scope of the present invention, the following claims are made.

What is claimed is:

1. An optical angle modulator comprising:
a first generating unit configured to generate first angle-modulated light and second angle-modulated light by performing angle modulation on continuous light using an electrical signal; and
a second generating unit configured to generate third angle-modulated light by causing partially degenerate four-wave mixing of the first angle-modulated light and the second angle-modulated light,
wherein a frequency band of the first angle-modulated light and a frequency band of the second angle-modulated light are different from each other, and
an angle of the second angle-modulated light decreases due to the electrical signal while an angle of the first angle-modulated light is increasing due to the electrical signal, and the angle of the second angle-modulated light increases due to the electrical signal while the angle of the first angle-modulated light is decreasing due to the electrical signal.

2. The optical angle modulator according to claim 1, wherein the second generating unit includes:
a mixer configured to generate fourth angle-modulated light and fifth angle-modulated light by causing partially degenerate four-wave mixing of the first angle-modulated light and the second angle-modulated light, and outputting signal light that includes the first angle-modulated light, the second angle-modulated light, the fourth angle-modulated light, and the fifth angle-modulated light, and
a filter configured to output the fourth angle-modulated light as the third angle-modulated light, by filtering the signal light.

3. The optical angle modulator according to claim 2, wherein the mixer is an optical fiber.

4. The optical angle modulator according to claim 3, wherein a frequency at which a dispersion value of the optical fiber is 0 is within the frequency band of the first angle-modulated light, the frequency band of the second angle-modulated light, or a frequency band between the frequency band of the first angle-modulated light and the frequency band of the second angle-modulated light.

5. The optical angle modulator according to claim 2, wherein the mixer is an optical semiconductor amplifier.

6. The optical angle modulator according to claim 1, wherein the second generating unit has a configuration in which a plurality of sets are connected in series,
the plurality of sets each include a mixer and a filter to which output of the mixer is input,
the mixer in each of the plurality of sets generates two types of new angle-modulated light by causing partially degenerate four-wave mixing of two types of input angle-modulated light input thereto, and outputs signal light that includes the two types of input angle-modulated light and the two types of new angle-modulated light,
the filter in a set among the plurality of sets connected in series other than a last set blocks the two types of input angle-modulated light included in signal light from the mixer in the same set, and outputs the two types of new angle-modulated light,
the filter in the last set among the plurality of sets connected in series outputs one of the two types of new angle-modulated light included in signal light from the mixer in the same set, as the third angle-modulated light, and
the first angle-modulated light and the second angle-modulated light are input to the mixer in a first set among the plurality of sets connected in series.

7. The optical angle modulator according to claim 1, wherein the first generating unit includes:
a first light source configured to generate first continuous light,
a second light source configured to generate second continuous light,
a first modulator configured to generate the first angle-modulated light by performing angle modulation on the first continuous light using the electrical signal, and a second modulator configured to generate the second angle-modulated light by performing angle modulation on the second continuous light using the electrical signal.

8. The optical angle modulator according to claim 7, wherein the second modulator is configured to delay a phase of the second continuous light while the first modulator is advancing a phase of the first continuous light based on an amplitude of the electrical signal, or the second modulator is configured to decrease a frequency of the second continuous light while the first modulator is increasing a frequency of the first continuous light based on the amplitude of the electrical signal.

9. The optical angle modulator according to claim 7, wherein a frequency difference between the frequency of the first continuous light and the frequency of the second continuous light is smaller than half of a sum of three times the bandwidth of angle-modulated light having a broader frequency band, of the first angle-modulated light and the second angle-modulated light, and the bandwidth of angle-modulated light having a narrower frequency band, of the first angle-modulated light and the second angle-modulated light.

10. The optical angle modulator according to claim 1, wherein an electric field component of the first angle-modulated light and an electric field component of the second angle-modulated light have a complex conjugate relation.

11. The optical angle modulator according to claim 1, wherein the first generating unit includes:

angle modulator configured to perform angle modulation on a sine wave signal based on the electrical signal and outputting an angle modulation signal, a light source configured to generate continuous light, and an intensity modulator configured to perform intensity modulation on the continuous light generated by the light source, using the angle modulation signal.

12. The optical angle modulator according to claim 11, wherein the first generating unit further includes a band-stop filter configured to suppress a carrier wave component of intensity-modulated light output by the intensity modulator.

13. The optical angle modulator according to claim 11, wherein the intensity modulator is configured to perform carrier wave suppressing intensity modulation on the continuous light generated by the light source, using the angle modulation signal.

14. The optical angle modulator according to claim 11, wherein a frequency of the sine wave signal is larger than a bandwidth of the angle modulation signal.

15. An optical transmission apparatus that includes the optical angle modulator according to claim 1.

* * * * *